United States Patent
Tsukiji et al.

(10) Patent No.: US 12,372,378 B2
(45) Date of Patent: Jul. 29, 2025

(54) ESTIMATION APPARATUS, ESTIMATION METHOD AND COMPUTER READABLE MEDIUM

(71) Applicant: Asahi Kasei Microdevices Corporation, Tokyo (JP)

(72) Inventors: Hidekazu Tsukiji, Tokyo (JP); Norio Shibusawa, Tokyo (JP); Ryosuke Sasanuma, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 254 days.

(21) Appl. No.: 18/325,112

(22) Filed: May 30, 2023

(65) Prior Publication Data

US 2023/0408296 A1    Dec. 21, 2023

(30) Foreign Application Priority Data

Jun. 21, 2022  (JP) ................... 2022-099381

(51) Int. Cl.
*G01D 5/14*    (2006.01)

(52) U.S. Cl.
CPC ..................... *G01D 5/14* (2013.01)

(58) Field of Classification Search
CPC ...................................... G01D 5/14
See application file for complete search history.

(56) References Cited

U.S. PATENT DOCUMENTS

| | | | | |
|---|---|---|---|---|
| 8,280,189 B2 * | 10/2012 | Bar-Tal | ........... | A61B 5/062 600/12 |
| 9,557,178 B2 * | 1/2017 | Ghose | ........... | H04W 4/029 |
| 10,126,108 B2 * | 11/2018 | Umer | ........... | A61B 5/1116 |
| 10,338,642 B2 * | 7/2019 | Furlong | ........... | G01R 33/07 |
| 11,598,638 B2 * | 3/2023 | Georgy | ........... | G01C 25/005 |
| 2010/0321006 A1 | 12/2010 | Suzuki | | |
| 2023/0215262 A1 * | 7/2023 | VanHorn | ........... | G01S 5/0231 340/539.1 |

FOREIGN PATENT DOCUMENTS

| | | |
|---|---|---|
| JP | 2006010461 A | 1/2006 |
| JP | 4096867 B2 | 6/2008 |
| JP | 2019191011 A | 10/2019 |
| JP | 2019200149 A | 11/2019 |
| JP | 2020098203 A | 6/2020 |
| WO | 2009078048 A1 | 6/2009 |

* cited by examiner

*Primary Examiner* — Walter L Lindsay, Jr.
*Assistant Examiner* — Milton Gonzalez

(57) ABSTRACT

An estimation apparatus comprises: a collection unit configured to collect a plurality of pieces of update information used for updating reference information, which indicates measurement values in accordance with a position or an attitude of a second portion against a first portion which is measured by at least one magnetic sensor while changing at least one of the position and the attitude of the second portion against the first portion over a predetermined movable range; a clustering unit configured to perform clustering on the plurality of pieces of update information according to a predetermined classification condition; and an updating unit configured to update the reference information based on at least one piece of update information included in a maximum class into which a highest number of pieces of information are classified among the plurality of pieces of update information.

13 Claims, 9 Drawing Sheets

ESTIMATION APPARATUS, ESTIMATION METHOD AND COMPUTER READABLE MEDIUM

The contents of the following patent application(s) are incorporated herein by reference:

NO. 2022-099381 filed in JP on Jun. 21, 2022

BACKGROUND

1. Technical Field

The present invention relates to an estimation apparatus, an estimation method, and a program.

2. Related Art

In Patent document 1, there is described as "a lookup table for correcting an angle at which the magnetic field sensor's value is output is created, by rotating the rotation axis by an electric motor at a speed at which a temporal change rate of a rotational speed is known by one or more revolutions, and by using the temporal change rate of the rotational speed at which a rotational speed varies at a known ratio by a time". In Patent document 2, there is described as "target identification is performed by calculating a plurality of types of indicators indicating a rough form of a range profile of each polarization channel and a plurality of types of indicators indicating a relationship between range profiles of a plurality of polarization channels, to combine feature quantities".

PRIOR ART DOCUMENT

Patent Document

Patent document 1: Japanese Patent No. 5263024
Patent document 2: Japanese Patent No. 4096867

DESCRIPTION OF EXEMPLARY EMBODIMENTS

Hereinafter, embodiments of the present invention will be described. However, the following embodiments are not for limiting the invention according to the claims. In addition, not all combinations of features described in the embodiment are essential to the solution of the invention.

Figure 1:
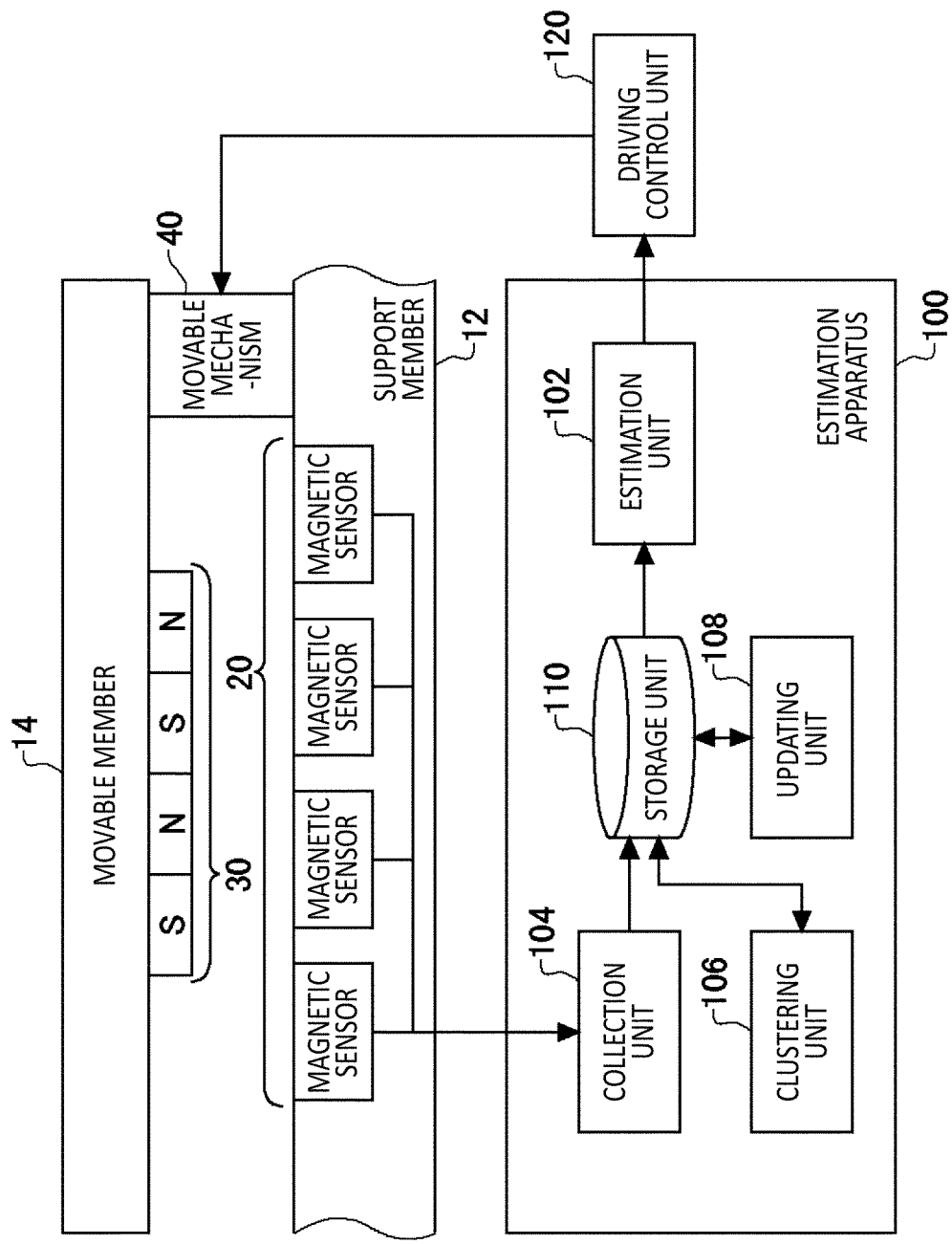
FIG. 1 shows an example of a functional block of an apparatus according to the present embodiment.
Figure 2A:
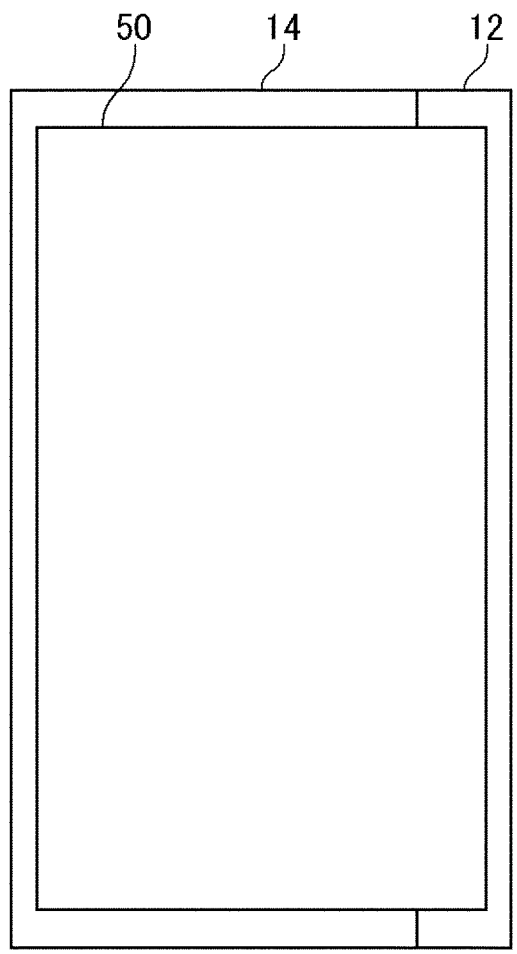
FIG. 2A is a diagram for describing a rollable smartphone.
Figure 2A:
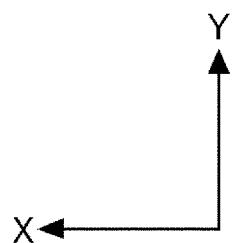
Figure 2B:
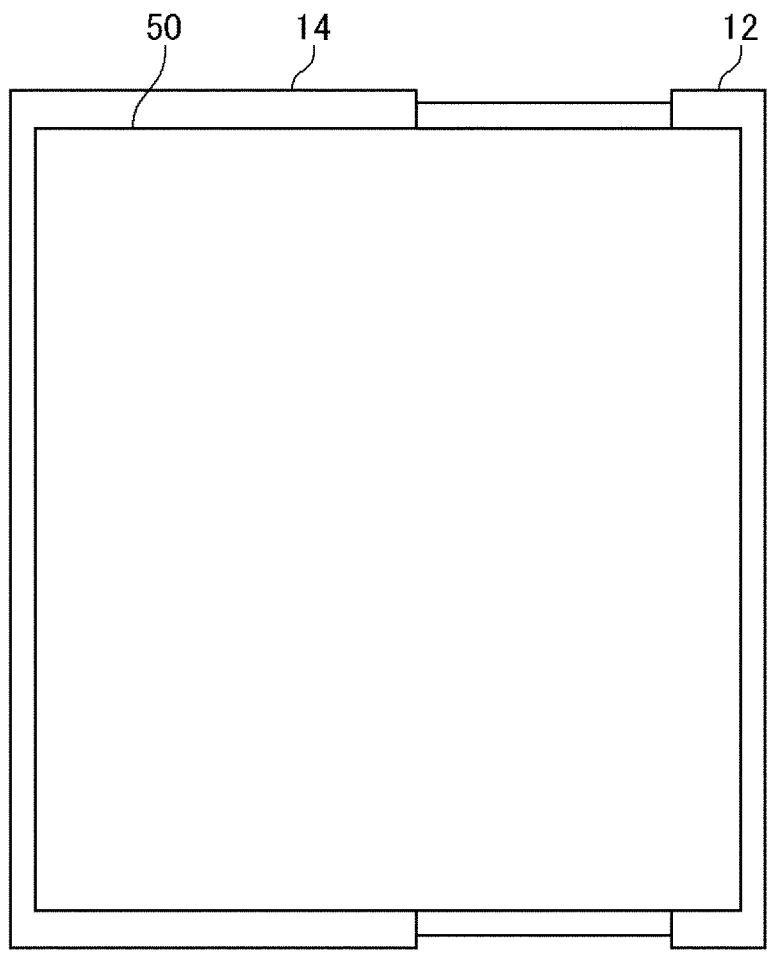
FIG. 2B is a diagram for describing a rollable smartphone.
Figure 2B:
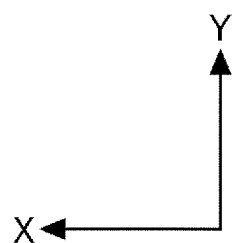
Figure 3A:
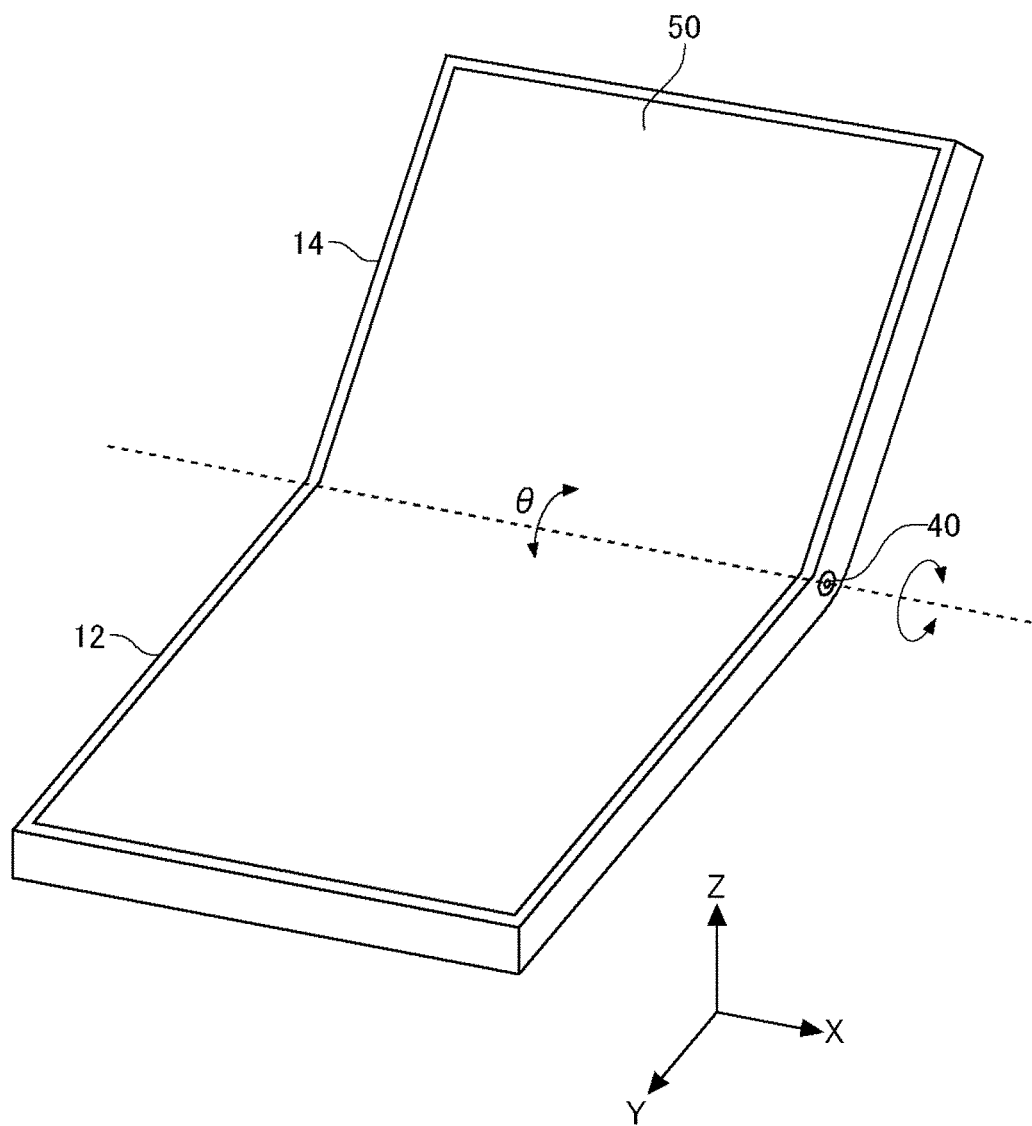
FIG. 3A is a diagram for describing a foldable smartphone.
Figure 3B:
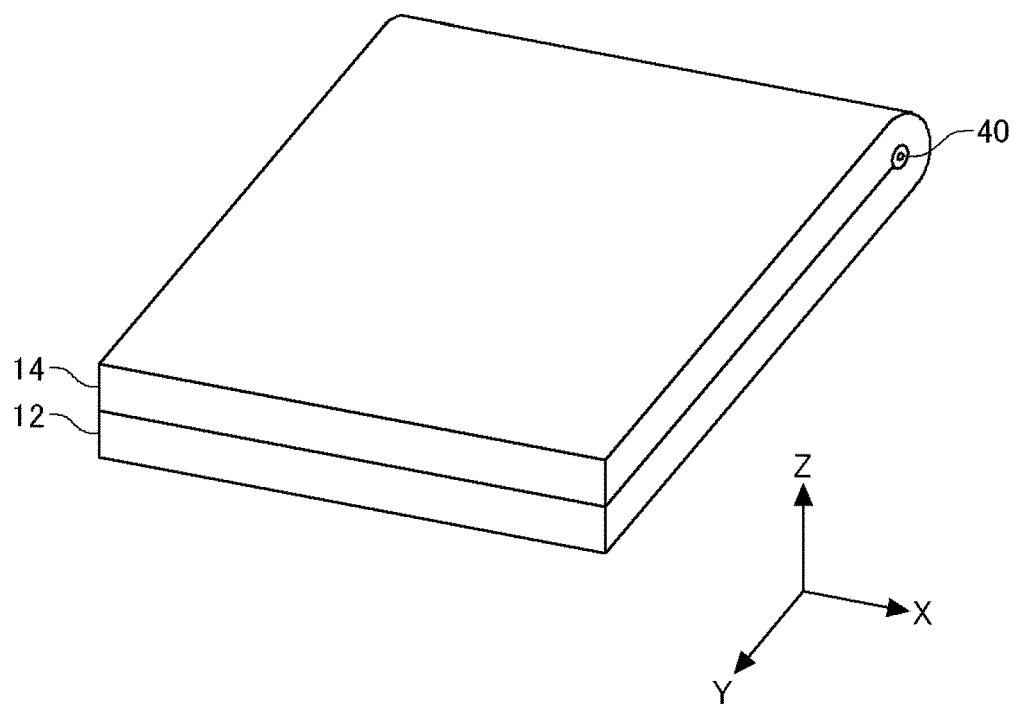
FIG. 3B is a diagram for describing a foldable smartphone.

FIG. 1 is an example of a functional block of an apparatus 10 according to the present embodiment. FIG. 2A and FIG. 2B respectively indicate an example of an appearance diagram when the apparatus 10 is a so-called rollable smartphone. FIG. 3A and FIG. 3B respectively indicate an example of an appearance diagram when the apparatus 10 is a so-called foldable smartphone.

The apparatus 10 includes a support member 12, a movable member 14, and a movable mechanism 40. The support member 12 is configured to support, via the movable mechanism 40, the movable member 14 so as to allow at least one of a position or an attitude of the movable member 14 against the support member 12 to be changed. The support member 12 may support to allow the movable member 14 to be movable along a predetermined direction via the movable mechanism 40. The support member 12 may support to allow the movable member 14 to rotate around an axis of the movable mechanism 40. The support member 12 is an example of a first portion, and the movable member 14 is an example of a second portion.

The movable mechanism 40 may have a driving source configured to provide driving force which causes the movable member 14 to move or rotate against the support member 12. The driving source may be an electrostatic actuator, VCM (voice coil motor), or an actuator such as a piezo actuator. The movable mechanism 40 does not have the driving source, and the movable member 14 may be manually moved or rotated against the support member 12 via the movable mechanism 40.

For example, as shown in FIG. 2A and FIG. 2B, the apparatus 10 may be a rollable smartphone whose display screen of the display expands and contracts. The support member 12 and the movable member 14 may configure a display unit. The movable member 14 may move along an X axis direction from a first state shown in FIG. 2A to a second state shown in FIG. 2B against the support member 12. In this way, a width of the display screen 50 in the X direction increases or decreases. For example, the display screen 50 may be a thin display such as an organic EL display or the like which can be wound around a rotation axis along the Y axis.

The apparatus 10 may be a zoom mechanism included in an imaging apparatus. The movable member 14 includes a zoom lens and a holding frame configured to hold the zoom lens, and the support member 12 may include a guide axis configured to support the holding frame holding the zoom lens so as to be movable in the optical axis direction.

The apparatus 10 may be a foldable smartphone whose display screen of the display can be folded as shown in FIG. 3A and FIG. 3B. The support member 12 and the movable member 14 may configure a display unit. The movable mechanism 40 may be a hinge mechanism which can fold the movable member 14 against the support member 12. The support member 12 may be integrally configured with the hinge mechanism. The movable member 14 may change the attitude against the support member 12 by rotating against the support member 12 via the hinge mechanism. By changing the state of the movable member 14 from a state in which the movable member 14 is folded against the support member 12 to a state in which the movable member 14 is not folded against the support member 12, an angle θ between the support member 12 and the movable member 14 may be changed from 0 degree to 180 degrees.

Back to FIG. 1, the apparatus 10 further includes a plurality of magnetic sensors 20, and a magnet unit 30. The magnetic sensor 20 is configured to measure a magnetic field at a position in which the magnetic sensor 20 is provided, and output the measurement value (for example, voltage or current) in accordance with the magnetic field. The magnetic sensor 20 may be a Hall element. In the present embodiment, an example is described in which the apparatus 10 includes four magnetic sensors 20. However, the apparatus 10 includes any number of magnetic sensors 20, and there is no problem as long as the apparatus 10 includes at least one magnetic sensor 20. There is no problem as long as the apparatus 10 includes a required number of magnetic sensors 20 for estimating the position or the attitude of the movable member 14 against the support member 12 over the entire movable range. The magnetic sensor 20 may output the measurement value in accordance with each magnetic field in the X axis, the Y axis, and the Z axis direction. However, in the present embodiment, to simplify the description, the description is focused on the measurement value in accordance with the magnetic field in the direction of any one axis of the X axis, the Y axis, and the Z axis (for example, the X axis direction).

The magnet unit 30 is configured to provide a magnetic field for each of the plurality of magnetic sensors 20. When the movable member 14 moves against the support member 12, the magnet unit 30 may have its S poles and N poles alternately arranged on the movable member 14 along a predetermined direction. The plurality of magnetic sensors 20 may be provided on the support member 12. When the movable member 14 moves along a predetermined direction against the support member 12, the plurality of magnetic sensors 20 may be provided on the support member 12 along the predetermined direction. The plurality of magnetic sensors 20 may be provided on the support member 12 at an equal interval along the predetermined direction.

When the movable member 14 rotates against the support member 12, the support member 12 is integrally configured with the movable mechanism 40, the magnet unit 30 is provided on the hinge mechanism which is the movable mechanism 40, or on the support member 12, and one magnetic sensor 20 may be provided on the movable member 14.

The apparatus 10 further includes an estimation apparatus 100, and a driving control unit 120. The estimation apparatus 100 is configured to estimate the position or the attitude of the movable member 14 against the support member 12 based on each measurement value of the plurality of magnetic sensors 20. The driving control unit 120 may control the movable mechanism so that the position or the attitude of the movable member 14 against the support member 12 becomes a target position or attitude, based on the position or the attitude of the movable member 14 against the support member 12 which is estimated by the estimation apparatus 100.

The plurality of magnetic sensors 20 are configured to measure the surrounding magnetic field, and output the measurement value indicating the magnitude of the surrounding magnetic field. With the movable member 14 moving or rotating against the support member 12, the surrounding magnetic field of each of the plurality of magnetic sensors 20 varies. The variation of each measurement value of the plurality of magnetic sensors 20 is in correlation with the variation of the position or the attitude of the movable member 14 against the support member 12. Accordingly, if the relationship between each measurement value of the plurality of magnetic sensors 20 and the position or the attitude of the movable member 14 against the support member 12 is determined in advance, the estimation apparatus 100 can estimate the position or the attitude of the movable member 14 against the support member 12, from the measurement value which is measured by each of the plurality of magnetic sensors 20.

The estimation apparatus 100 includes an estimation unit 102, a collection unit 104, a clustering unit 106, an updating unit 108, and a storage unit 110. The storage unit 110 is configured to store reference information indicating the measurement value in accordance with the position or the attitude of the movable member 14 against the support member 12. The reference information may indicate a combination of the respective measurement values of the plurality of magnetic sensors 20 in association with the position or the attitude of the movable member 14 against the support member 12. The reference information may indicate the measurement values of the plurality of magnetic sensors 20 in accordance with the position or the attitude of the movable member 14 against the support member 12 in a predetermined movable range. The reference information may indicate a combination of the respective measurement values of the plurality of magnetic sensors 20 in accordance with the position or the attitude of the movable member 14 against the support member 12 in a predetermined movable range.

The collection unit 104 may sequentially collect the measurement values each indicating the magnitude of the magnetic field measured by each of the plurality of magnetic sensors 20 for each predetermined time period, to store them in the storage unit 110 as update information. The collection unit 104 may sequentially collect the measurement values each indicating the magnitude of the magnetic field measured by each of the plurality of magnetic sensors 20 and timestamps each indicating the time measured by each of the plurality of magnetic sensors 20, to store them in the storage unit 110 as update information. The estimation unit 102 is configured to estimate the position or the attitude of the movable member 14 against the support member 12, based on the latest measurement values measured by each of the plurality of magnetic sensors 20 and the reference information stored in the storage unit 110.

Figure 4:
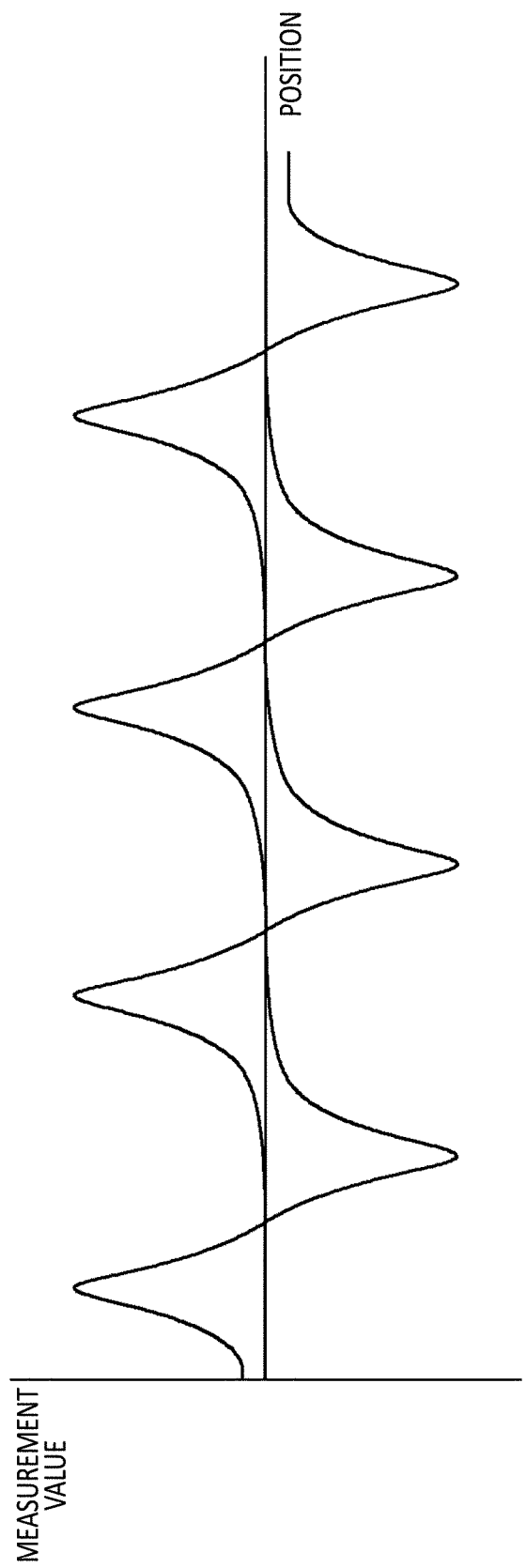
FIG. 4 shows an example of reference information.
Figure 5:
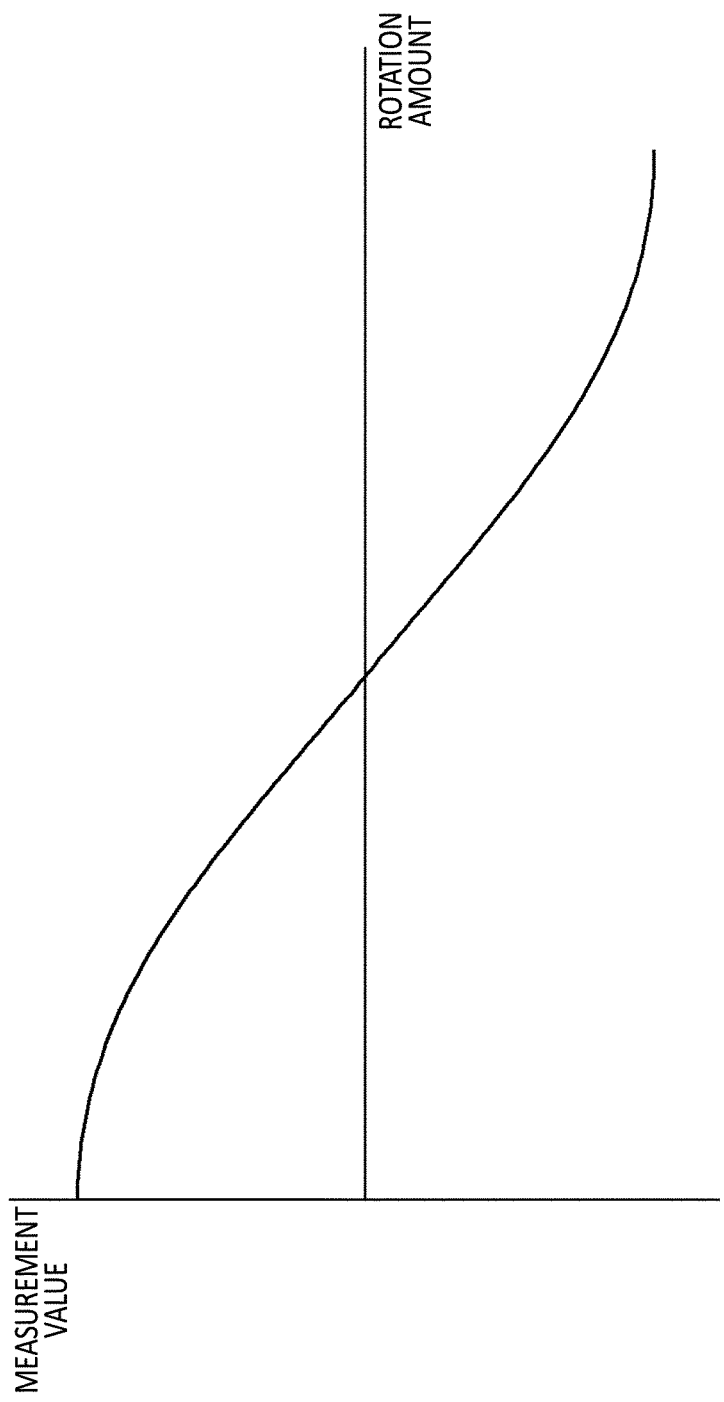
FIG. 5 shows an example of reference information.

FIG. 4 and FIG. 5 respectively indicate an example of the reference information. The reference information shown in FIG. 4 indicates a relationship between the position of the movable member 14 against the support member 12 in a case in which the movable member 14 moves along a predetermined direction against the support member 12 and each measurement value of the four magnetic sensors 20.

The reference information may be generated before factory delivery. The driving control unit 120 is configured to control the movable mechanism 40 to acquire each measurement value of the plurality of magnetic sensors 20 at an equal interval while causing the movable member 14 to move at an equal interval from one end to the other end in a predetermined movable range against the support member 12. The driving control unit 120 may control the movable mechanism 40 to acquire each measurement value of the plurality of magnetic sensors 20 at an equal interval while causing the movable member 14 to move at an equal interval and constant speed from one end to the other end in a predetermined movable range against the support member 12. The reference information may be generated based on each measurement value acquired by repeating these operation multiple times and a movement amount from the one end in the predetermined movable range.

The reference information shown in FIG. 5 indicates a relationship between the attitude of the movable member 14 against the support member 12 in a case in which the movable member 14 rotates against the support member 12 and the measurement value of one magnetic sensor 20. The driving control unit 120 may control the movable mechanism 40 to acquire the measurement value of the magnetic sensor 20 at an equal interval while causing the movable member 14 to rotate at an equal interval and constant speed against the support member 12. The reference information may be generated based on each measurement value acquired by repeating this operation multiple times and a rotation amount from the folded state. The measurement value of the magnetic sensor 20 in a case in which the movable member 14 is in a folded state, that is, in a case in which the angle θ is 0 degree, and the measurement value of the magnetic sensor 20 in a case in which the movable member 14 is in a not-folded state, that is, in a case in which the angle θ is 180 degrees, may be acquired. The reference information may be generated based on each measurement value acquired by repeating this operation multiple times and a rotation amount from the folded state.

As mentioned above, the reference information is generated before factory delivery and stored in the storage unit 110. However, due to disturbance of a difference between magnitudes of the magnetic fields in an environment in which the apparatus 10 is used or the like, a correlation between the magnitude of the magnetic field measured by the magnetic sensor 20 and the position or the attitude of the movable member 14 against the support member 12 may vary.

The disturbance includes a temporal disturbance due to a difference between the magnitudes of the magnetic field in an environment in which the apparatus 10 exists, and a temporal disturbance due to a change in the speed of the movement or the rotation of the movable member 14 caused by the application of external force to the apparatus 10. The disturbance includes a continuous disturbance caused by a change in a magnetization state of the apparatus 10 due to a housing of the apparatus 10 being magnetized by being affected by the magnetic field of the environment in which the apparatus 10 exists, for example.

For the temporal disturbance, the reference information does not need to be updated because the disturbance is resolved if the apparatus 10 is moved to a place in which it does not affected by the magnetic field which is the cause of the disturbance or if the external force to the apparatus 10 is removed. On the other hand, for the continuous disturbance, it is preferable to update the reference information because the disturbance continuously affects the estimation accuracy of the position or the attitude of the movable member 14 against the support member 12.

Therefore, in the present embodiment, a calibration is performed on the reference information in order to remove only the effect due to the continuous disturbance after separating the effect due to the temporal disturbance and the effect due to the continuous disturbance from each other.

The collection unit 104 is configured to collect update information indicating a measurement value in accordance with the position of the movable member 14 against the support member 12 which is measured by the plurality of magnetic sensors 20 while the position of the movable member 14 against the support member 12 is changed over a predetermined movable range.

The collection unit 104 is configured to collect update information indicating a measurement value in accordance with the position of the movable member 14 against the support member 12 which is measured at an equal interval by the plurality of magnetic sensors 20 while the position of the movable member 14 against the support member 12 is changed at a constant speed over a predetermined movable range. When the movable member 14 is moved against the support member 12 at a constant speed, the time spent for moving from one end of the movable range is proportional to a distance. Therefore, the collection unit 104 is configured to collect the measurement value in accordance with the time spent for moving from the one end of the movable range as the update information indicating the measurement value in accordance with the position of the movable member 14 against the support member 12.

At a stage in which the number of the update information reaches a reference number, the clustering unit 106 performs clustering on the collected update information and current reference information according to a predetermined classification condition. The clustering unit 106 may perform the clustering according to a degree of similarity of each of the collected update information and the current reference information. The clustering unit 106 may perform the clustering based on the distance between the measurement values for each position of the movable member 14 against the support member 12. The clustering unit 106 may perform clustering by classifying the collected update information and the current reference information for each piece of update information in which the difference in the distances between the measurement values for each position of the movable member 14 against the support member 12 is equal to or less than a threshold. The clustering unit 106 may perform clustering based on a distance between minimum values and between maximum values among the measurement values for each position of the movable member 14 against the support member 12 indicated in the update information and the reference information. The clustering unit 106 may perform clustering based on a degree of similarity between waveforms indicating changes of the measurement value in accordance with the position of the movable member 14 against the support member 12. The clustering unit 106 may perform clustering on the collected update information and the current reference information according to an unsupervised machine learning algorithm. The clustering unit 106 may perform clustering on the collected update information and the current reference information according to the K-means method. The K-means method is a method for plotting data in a space of dimension corresponding to the number of parameters and classifying the data by their distance.

The updating unit 108 is configured to update the reference information based on the update information included in a maximum class if the number of the update information included in the maximum class is equal to or more than a majority of the number of the collected update information. If the reference information is included in the maximum class, the updating unit 108 may update the reference information based on the update information included in the maximum class and the reference information. The updating unit 108 may update the update information with an average value of the measurement value for each position of the movable member 14 against the support member 12 indicated in the update information included in the maximum class. If the reference information is included in the maximum class, the updating unit 108 may update the reference information with a measurement value for each position of the movable member 14 against the support member 12 indicated in the reference information, and an average value of the measurement value for each position of the movable member 14 against the support member 12 indicated in the update information included in the maximum class.

The updating unit 108 may update the reference information based on the latest update information among the update information included in the maximum class. The updating unit 108 may store the latest update information among the update information included in the maximum class in the storage unit 110 as the reference information.

Figure 6:
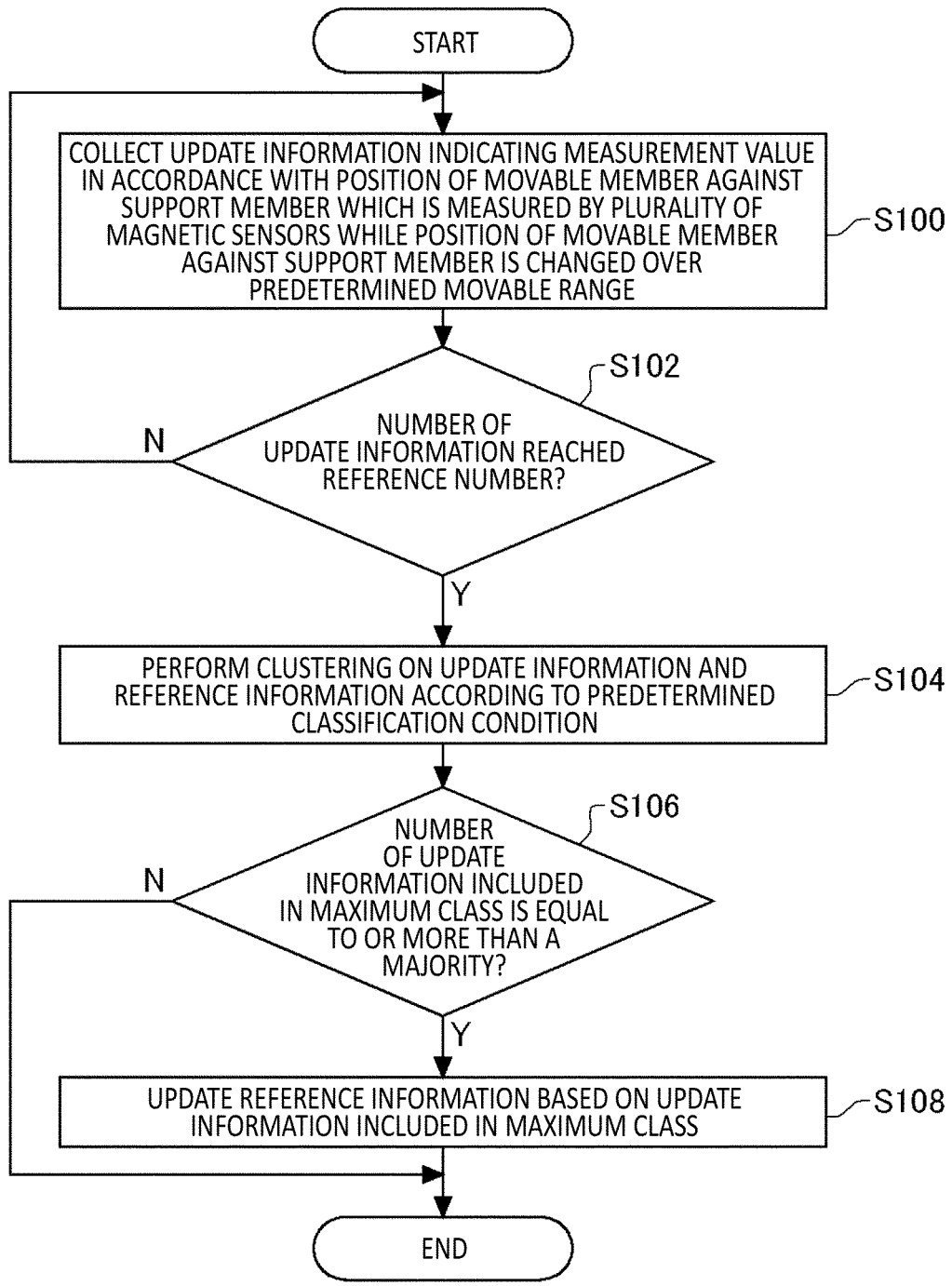
FIG. 6 is a flowchart indicating an example of an update procedure of reference information.

FIG. 6 is a flowchart indicating an example of an update procedure of reference information. During a normal operation of the apparatus 10, the estimation apparatus 100 may perform an update on the reference information.

The collection unit 104 collects update information indicating a measurement value in accordance with the position of the movable member 14 against the support member 12 which is measured by the plurality of magnetic sensors 20 while the position of the movable member 14 against the support member 12 is changed over a predetermined movable range (S100). While the movable member 14 is moving at a predetermined speed from one end to the other end in the movable range, the collection unit 104 may collect the update information indicating the measurement value in accordance with the position of the movable member 14 against the support member 12 measured by the plurality of magnetic sensors 20 at an equal interval.

The clustering unit 106 determines whether the number of the collected update information has reached a reference number (S102). If the number of the collected update information has not reach the reference number, the collection unit 104 continues to collect further update information.

If the number of the collected update information reaches the reference number, the clustering unit 106 performs clustering on the collected update information and current reference information according to a predetermined classification condition (S104). After the clustering is completed, the updating unit 108 determines whether the number of the update information included in the maximum class is equal to or more than a majority of the number of the collected update information (S106). If the number of the update information included in the maximum class does not exceed a majority of the number of the collected update information, the updating unit 108 ends the process without performing the update on the reference information, and the collection unit 104 continues to collect the update information.

If the number of the update information included in the maximum class is equal to or more than a majority of the number of the collected update information, the updating unit 108 updates the reference information based on the update information included in the maximum class (S108). If the reference information is included in the maximum class, the updating unit 108 may update the reference information based on the update information included in the maximum class and the reference information.

As described above, according to the present embodiment, a clustering is first performed on the update information, without updating the reference information by using all of the collected update information. In this way, update information which may be affected by the temporal disturbance and update information which may be affected by the continuous disturbance without being affected by the temporal disturbance is separated from each other. The updating unit 108 can update the reference information based on the update information which may be affected by the continuous disturbance without being affected by the temporal disturbance. Therefore, the reference information can be accurately calibrated.

Figure 7:
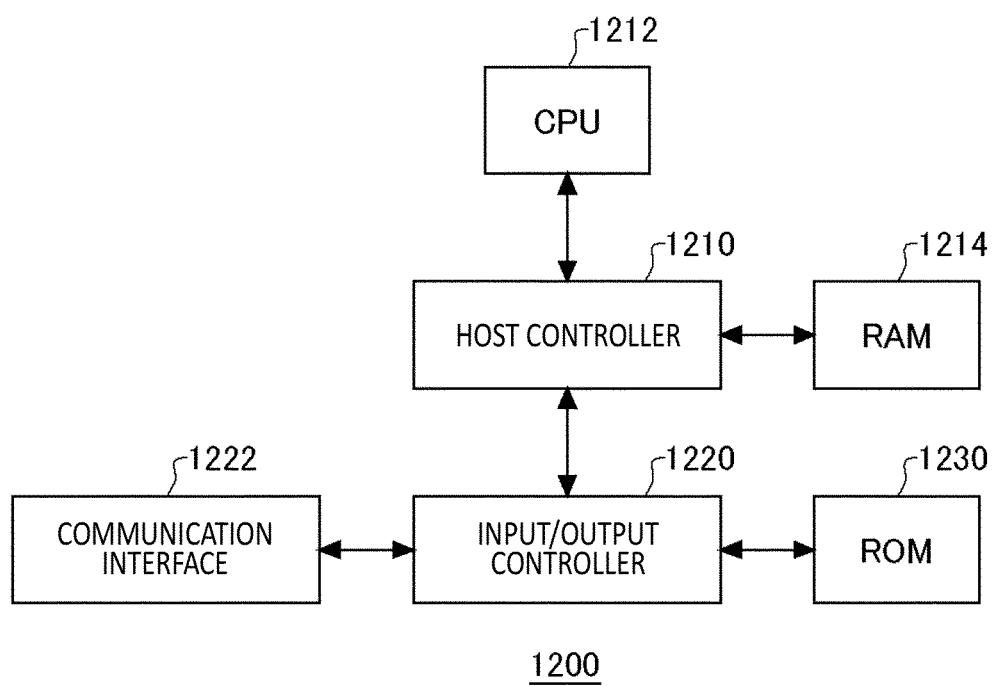
FIG. 7 shows an example of a hardware configuration.

FIG. 7 shows an example of a computer 1200 on which the plurality of aspects of the present invention may be entirely or partially embodied. Programs installed in the computer 1200 can cause the computer 1200 to function as operations associated with the apparatus according to the embodiments of the present invention or one or more "units" of the apparatuses. Alternatively, the programs can cause the computer 1200 to execute the operations or the one or more "units". The programs can cause the computer 1200 to execute a process according to the embodiments of the present invention or steps of the process. Such programs may be executed by a CPU 1212 to cause the computer 1200 to perform specific operations associated with some or all of the blocks in the flowcharts and block diagrams described in the present specification.

The computer 1200 according to the present embodiment includes the CPU 1212 and a RAM 1214, which are mutually connected by a host controller 1210. The computer 1200 also includes a communication interface 1222 and an input/output unit, which are connected to the host controller 1210 via an input/output controller 1220. The computer 1200 also includes a ROM 1230. The CPU 1212 operates according to the programs stored in the ROM 1230 and the RAM 1214, thereby controlling each unit.

The communication interface 1222 communicates with other electronic devices via a network. A hard disk drive may store the programs and data used by the CPU 1212 in the computer 1200. The ROM 1230 stores therein boot programs or the like executed by the computer 1200 at the time of activation, and/or stores programs depending on hardware of the computer 1200. The programs are provided via a computer readable storage medium such as CR-ROM, a USB memory or an IC Card or a network. The programs are installed on the RAM 1214, which also is an example of the computer readable storage medium, or the ROM 1230 and performed by the CPU 1212. Information processing written in these programs is read by the computer 1200, and provides cooperation between the programs and the various types of hardware resources described above. An apparatus or a method may be configured by implementing operations or processing of information according to a use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. Under the control of the CPU 1212, the communication interface 1222 reads transmission data which is stored in the RAM 1214 or a transmission buffer region which is provided in a storage media such as a USB memory, to transmit the read transmission data to the network or write the reception data received from the network into a reception buffer region or the like provided on the storage media.

Also, the CPU 1212 may cause the whole or required part of files which are stored in the external storage media (such as USB memory) or the database to be read by the RAM 1214, to perform a various type of processes for the data on the RAM 1214. Then, the CPU 1212 may write back the processed data to the external storage media.

A various type of information such as a various type of programs, data, tables and databases may be stored in a storage media to undergo an information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. Also, the CPU 1212 may retrieve information in the file, database or the like in the storage media. For example, when a plurality of entries each having an attribute value of the first attribute associated with an attribute value of the second attribute are stored in a storage media, the CPU 1212 may retrieve, among the plurality of entries, an entry whose attribute value of the first attribute is specified and matches the conditions and read the attribute value of the second attribute stored in the entry, thereby acquiring the attribute value of the second attribute associated with the first attribute which satisfies a predetermined condition.

The programs or software module described above may be stored on the computer 1200 or in a computer readable storage medium near the computer 1200. Also, a storage media such as a hard disk or a RAM provided in a server system which is connected to a dedicated communication network or the Internet is allowed to be used as a computer readable storage medium, thereby a program is provided in a computer 1200 via the network.

A computer readable medium may include any tangible device that can store instructions to be executed by a suitable device. As a result, the computer readable medium having instructions stored therein includes an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

Computer readable instructions may include either a source code or an object code written in any combination of one or more programming languages. The source code or the object code includes a conventional procedural programming language. The conventional procedural programming language may be assembler instructions, instruction-set-architecture (ISA) instructions, machine instructions, machine dependent instructions, microcode, firmware instructions, state-setting data, or an object oriented programming language such as Smalltalk (registered trademark), JAVA (registered trademark), C-F-F, etc., and programming languages, such as the "C" programming language or similar programming languages. Computer readable instructions may be provided to a processor of a general purpose computer, special purpose computer, or other programmable data processing device, or to programmable circuitry, locally or via a local area network (LAN), a wide area network (WAN) such as the Internet, etc. The processor or the programmable circuitry may execute the computer readable instructions in order to create means for performing operations specified in the flowcharts or block diagrams. An example of the processor includes a computer processor, processing unit, microprocessor, digital signal processor, controller, microcontroller, or the like.

While the present invention has been described with the embodiments, the technical scope of the present invention is not limited to the above-described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES 10 apparatus
12 support member
14 movable member
20 magnetic sensor
30 magnet unit
40 movable mechanism
50 display screen
100 estimation apparatus
102 estimation unit
104 collection unit
106 clustering unit
108 updating unit
110 storage unit
120 driving control unit
1200 computer
1210 host controller
1212 CPU
1214 RAM
1220 input/output controller
1222 communication interface
1230 ROM.

What is claimed is:

1. An estimation apparatus which is configured to estimate at least one of a position and an attitude of a second portion against a first portion in an apparatus comprising the first portion, the second portion, a movable mechanism which is configured to change at least one of a position and an attitude of the second portion against the first portion, at least one magnetic sensor which is provided in one of the first portion or the second portion, a magnet unit which is provided in the other of the first portion or the second portion and which is configured to provide a magnetic field which is measured by the at least one magnetic sensor, wherein the estimation apparatus comprises:

an estimation unit configured to estimate a position or an attitude of the second portion against the first portion at a first time point, based on a measurement value at the first time point measured by the at least one magnetic sensor and reference information indicating measurement values of the at least one magnetic sensor in accordance with the position or the attitude of the second portion against the first portion;

a collection unit configured to collect a plurality of pieces of update information used for updating the reference information, which indicates measurement values in accordance with the position or the attitude of the second portion against the first portion which is measured by the at least one magnetic sensor while changing at least one of the position or the attitude of the second portion against the first portion over a predetermined movable range;

a clustering unit configured to perform clustering on the plurality of pieces of update information according to a predetermined classification condition; and an updating unit configured to update the reference information based on at least one piece of update information included in a maximum class into which a highest number of pieces of information are classified among the plurality of pieces of update information.

2. The estimation apparatus according to claim 1, wherein the updating unit is configured not to update the reference information based on the at least one piece of update information included in the maximum class when a number of the update information included in the maximum class is less than a reference number defined based on a number of the plurality of pieces of update information.

3. The estimation apparatus according to claim 1, wherein the updating unit is configured not to update the reference information based on the at least one piece of update information included in the maximum class when a number of the update information included in the maximum class is less than a majority of a number of the plurality of pieces of update information.

4. The estimation apparatus according to claim 1, wherein the clustering unit is configured to perform clustering on the plurality of pieces of update information and the reference information according to the predetermined classification condition.

5. The estimation apparatus according to claim 4, wherein the clustering unit is configured to:
  when the reference information is included in the maximum class, update the reference information by averaging, for each position or attitude of the second portion against the first portion, each measurement value in accordance with the position or the attitude of the second portion against the first portion indicated in the at least one piece of update information and each measurement value in accordance with the position or the attitude of the second portion against the first portion indicated in the reference information; and
  when the reference information is not included in the maximum class, update the reference information by averaging, for each position or attitude of the second portion against the first portion, each measurement value in accordance with the position or the attitude of the second portion against the first portion indicated in the at least one piece of update information.

6. The estimation apparatus according to claim 1, wherein the clustering unit is configured to update the reference information based on the latest update information among the at least one piece of update information.

7. The estimation apparatus according to claim 1, wherein the collection unit is configured to collect the plurality of pieces of update information which indicates measurement values in accordance with the position or the attitude of the second portion against the first portion which is measured at an equal interval by the at least one magnetic sensor while changing at least one of the position or the attitude of the second portion against the first portion at a constant speed over the predetermined movable range.

8. The estimation apparatus according to claim 1, wherein
  the first portion and the second portion are configured to configure a display unit, and
  the second portion is configured to change a position against the first portion by moving in a predetermined direction against the first portion and to change a width of a display screen in the predetermined direction of the display unit.

9. The estimation apparatus according to claim 1, wherein
  the first portion and the second portion are configured to configure a display unit, and
  the movable mechanism is a hinge mechanism which can fold the second portion against the first portion, and
  the second portion is configured to change the attitude against the first portion by rotating against the first portion via the hinge mechanism.

10. The estimation apparatus according to claim 9, wherein
  the at least one magnetic sensor is configured to be provided in the second portion,
  the hinge mechanism is integrally configured with the first portion, and
  the magnet unit is provided on the hinge mechanism.

11. An apparatus comprising:
  the estimation apparatus according to claim 1;
  the first portion;
  the second portion; and
  the movable mechanism.

12. An estimation method for estimating at least one of a position and an attitude of a second portion against a first portion in an apparatus comprising the first portion, the second portion, a movable mechanism which is configured to change at least one of a position and an attitude of the second portion against the first portion, at least one magnetic sensor which is provided in one of the first portion or the second portion, a magnet unit which is provided in the other of the first portion or the second portion and which is configured to provide a magnetic field which is measured by the at least one magnetic sensor, wherein the estimation method comprises:
  estimating a position or an attitude of the second portion against the first portion at a first time point, based on a measurement value at the first time point measured by the at least one magnetic sensor and reference information indicating measurement values of the at least one magnetic sensor in accordance with the position or the attitude of the second portion against the first portion;
  collecting a plurality of pieces of update information used for updating the reference information, which indicates measurement values in accordance with the position or the attitude of the second portion against the first portion which is measured by the at least one magnetic sensor while changing at least one of the position or the attitude of the second portion against the first portion over a predetermined movable range;
  performing clustering on the plurality of pieces of update information according to a predetermined classification condition; and
  updating the reference information based on at least one piece of update information included in a maximum class into which a highest number of pieces of information are classified among the plurality of pieces of update information.

13. A non-transitory computer readable medium which is configured to store a program for causing a computer to function as an estimation apparatus which is configured to estimate at least one of a position and an attitude of a second portion against a first portion in an apparatus comprising the first portion, the second portion, a movable mechanism which is configured to change at least one of a position and an attitude of the second portion against the first portion, at least one magnetic sensor which is provided in one of the first portion or the second portion, a magnet unit which is provided in the other of the first portion or the second portion and which is configured to provide a magnetic field which is measured by the at least one magnetic sensor, wherein the computer readable medium configured to store the program causes the computer to perform:
  estimating a position or an attitude of the second portion against the first portion at a first time point, based on a measurement value at the first time point measured by the at least one magnetic sensor and reference information indicating measurement values of the at least one magnetic sensor in accordance with the position or the attitude of the second portion against the first portion;
  collecting a plurality of pieces of update information used for updating the reference information, which indicates measurement values in accordance with the position or the attitude of the second portion against the first portion which is measured by the at least one magnetic sensor while changing at least one of the position or the attitude of the second portion against the first portion over a predetermined movable range;
  performing clustering on the plurality of pieces of update information according to a predetermined classification condition; and
  updating the reference information based on at least one piece of update information included in a maximum class into which a highest number of pieces of information are classified among the plurality of pieces of update information.

* * * * *